US012690026B2

(12) United States Patent

Takahashi et al.

(10) Patent No.: US 12,690,026 B2

(45) Date of Patent: Jul. 21, 2026

(54) TERMINAL, RADIO COMMUNICATION METHOD, AND BASE STATION

(71) Applicant: NTT DOCOMO, INC., Tokyo (JP)

(72) Inventors: Yuki Takahashi, Tokyo (JP); Shinya Kumagai, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 287 days.

(21) Appl. No.: 18/041,885

(22) PCT Filed: Aug. 17, 2021

(86) PCT No.: PCT/JP2021/030054

§ 371 (c)(1),
(2) Date: Feb. 16, 2023

(87) PCT Pub. No.: WO2022/039164

PCT Pub. Date: Feb. 24, 2022

(65) Prior Publication Data

US 2023/0269731 A1 Aug. 24, 2023

(30) Foreign Application Priority Data

Aug. 21, 2020 (JP) ................................. 2020-140224

(51) Int. Cl.
H04W 72/1263 (2023.01)
H04W 72/51 (2023.01)
H04W 72/56 (2023.01)
(52) U.S. Cl.
CPC ....... H04W 72/1263 (2013.01); H04W 72/51 (2023.01); H04W 72/56 (2023.01)

(58) Field of Classification Search
CPC .. H04W 72/1263; H04W 72/56; H04W 72/51
See application file for complete search history.

(56) References Cited

U.S. PATENT DOCUMENTS

2019/0200375 A1    6/2019 Yasukawa et al.
2020/0068557 A1    2/2020 Lee et al.
(Continued)

FOREIGN PATENT DOCUMENTS

AU        2017338040 B2 *  11/2020   ............ H04W 72/23
CN          103109489 B *   8/2016   ........... H04L 5/0048
(Continued)

OTHER PUBLICATIONS

Office Action issued in Japanese Application No. 2022-543958, dated Aug. 6, 2024 (6 pages).

(Continued)

*Primary Examiner* — Saad A. Waqas

(74) *Attorney, Agent, or Firm* — Osha Bergman Watanabe & Burton LLP

(57) ABSTRACT

To appropriately control one or more UL transmissions in which configuration of priorities is supported. A terminal according to an aspect of the present disclosure includes a receiving section that receives information related to simultaneous transmission of UL transmissions, and a control section that, when a plurality of UL transmissions with different priorities overlap in a time domain, controls transmission processing of the plurality of UL transmissions, based on the information related to the simultaneous transmission.

5 Claims, 8 Drawing Sheets

CC#1

CC#2

(56) References Cited

U.S. PATENT DOCUMENTS

| | | | |
|---|---|---|---|
| 2020/0169958 A1 | 5/2020 | Lee et al. | |
| 2020/0351801 A1* | 11/2020 | Jeon | H04W 52/48 |
| 2020/0359398 A1 | 11/2020 | Takahashi et al. | |
| 2020/0396701 A1* | 12/2020 | Yi | H04W 72/569 |
| 2021/0314937 A1* | 10/2021 | Huang | H04L 5/001 |
| 2021/0329679 A1* | 10/2021 | Hosseini | H04W 72/23 |
| 2023/0188306 A1* | 6/2023 | Nory | H04L 5/001 |
| | | | 370/330 |

FOREIGN PATENT DOCUMENTS

| | | | | |
|---|---|---|---|---|
| CN | 109565792 A | | 4/2019 | |
| CN | 109997327 A | | 7/2019 | |
| CN | 110832915 A | | 2/2020 | |
| CN | 115918200 A | * | 4/2023 | H04W 72/1263 |
| EP | 3217701 A1 | * | 9/2017 | H04W 88/06 |
| JP | 2020-519188 A | | 6/2020 | |
| TW | 201424434 A | * | 6/2014 | H04W 52/367 |
| WO | WO-2018203732 A1 | * | 11/2018 | H04W 52/146 |
| WO | WO-2019069750 A1 | * | 4/2019 | H04W 8/24 |
| WO | WO-2019098236 A1 | * | 5/2019 | H04W 72/52 |

OTHER PUBLICATIONS

International Search Report issued in PCT/JP2021/030054 on Nov. 16, 2021 (2 pages).

Written Opinion of the International Searching Authority issued in PCT/JP2021/030054 on Nov. 16, 2021 (3 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in counterpart Chinese Patent Application No. 202180072347.5 mailed on Jan. 14, 2026 (19 pages).

* cited by examiner

FIG. 1A

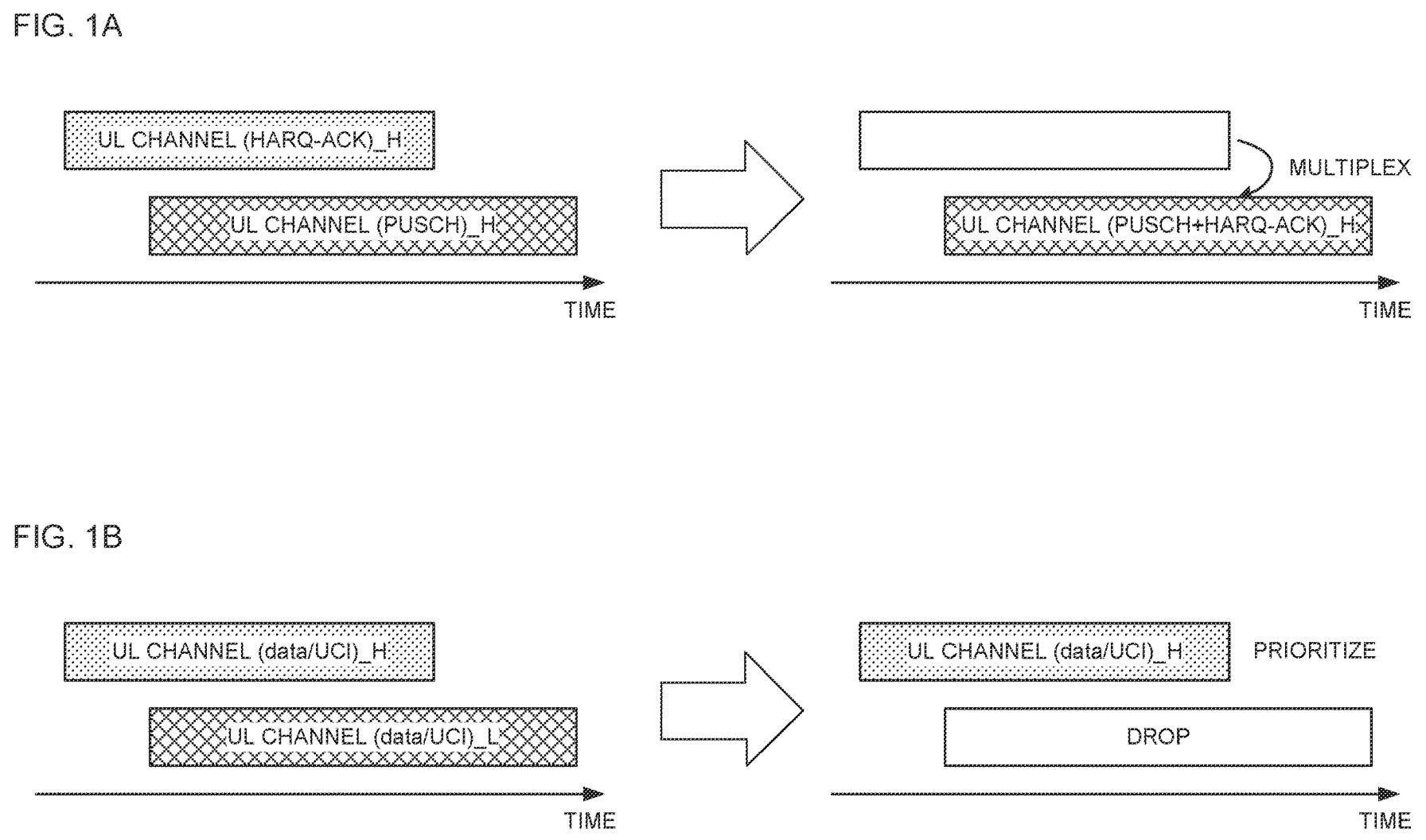

UL CHANNEL (HARQ-ACK)_H

UL CHANNEL (PUSCH)_H

TIME

MULTIPLEX

UL CHANNEL (PUSCH+HARQ-ACK)_H

TIME

FIG. 1B

UL CHANNEL (data/UCI)_H

UL CHANNEL (data/UCI)_L

TIME

PRIORITIZE

UL CHANNEL (data/UCI)_H

DROP

TIME

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, 5G, NR, and the like), for example, it is assumed that a plurality of services (also referred to as use cases, communication types, and the like) having different communication requirements coexist, such as high speed and high capacity (for example, enhanced Mobile Broad Band (eMBB)), massive terminals (for example, massive Machine Type Communication (mMTC), Internet of Things (IoT)), and ultra high reliability and low latency (for example, Ultra Reliable and Low Latency Communications (URLLC)).

For example, in Rel. 16 or later versions, a study has been carried out on a scheme in which priorities are configured for signals/channels and communication is controlled based on the priorities configured for each of the signals/channels. For example, it is assumed that, when a plurality of signals/channels overlap, transmission and reception are controlled based on the priorities of the respective signals/channels.

At the same time, a case is also considered in which a plurality of UL transmissions transmitted in different carriers (or cells, CCs) overlap in a time domain and the plurality of UL transmissions have different priorities. A sufficient study has not been carried out on how to control UL transmissions when a plurality of UL transmissions with different priorities are configured/scheduled in the same time domain in different carriers as described above.

In view of this, the present disclosure has one object to provide a terminal, a radio communication method, and a base station that enable appropriate control of one or more UL transmissions in which configuration of priorities is supported.

Solution to Problem

A terminal according to an aspect of the present disclosure includes a receiving section that receives information related to simultaneous transmission of UL transmissions, and a control section that, when a plurality of UL transmissions with different priorities overlap in a time domain, controls transmission processing of the plurality of UL transmissions, based on the information related to the simultaneous transmission.

Advantageous Effects of Invention

According to an aspect of the present disclosure, one or more UL transmissions in which configuration of priorities is supported can be appropriately controlled.

BRIEF DESCRIPTION OF DRAWINGS

FIG. 1A and FIG. 1B are each a diagram to show an example of UL transmission control based on priorities;

DESCRIPTION OF EMBODIMENTS

\<Traffic Types\>

Figure 2:
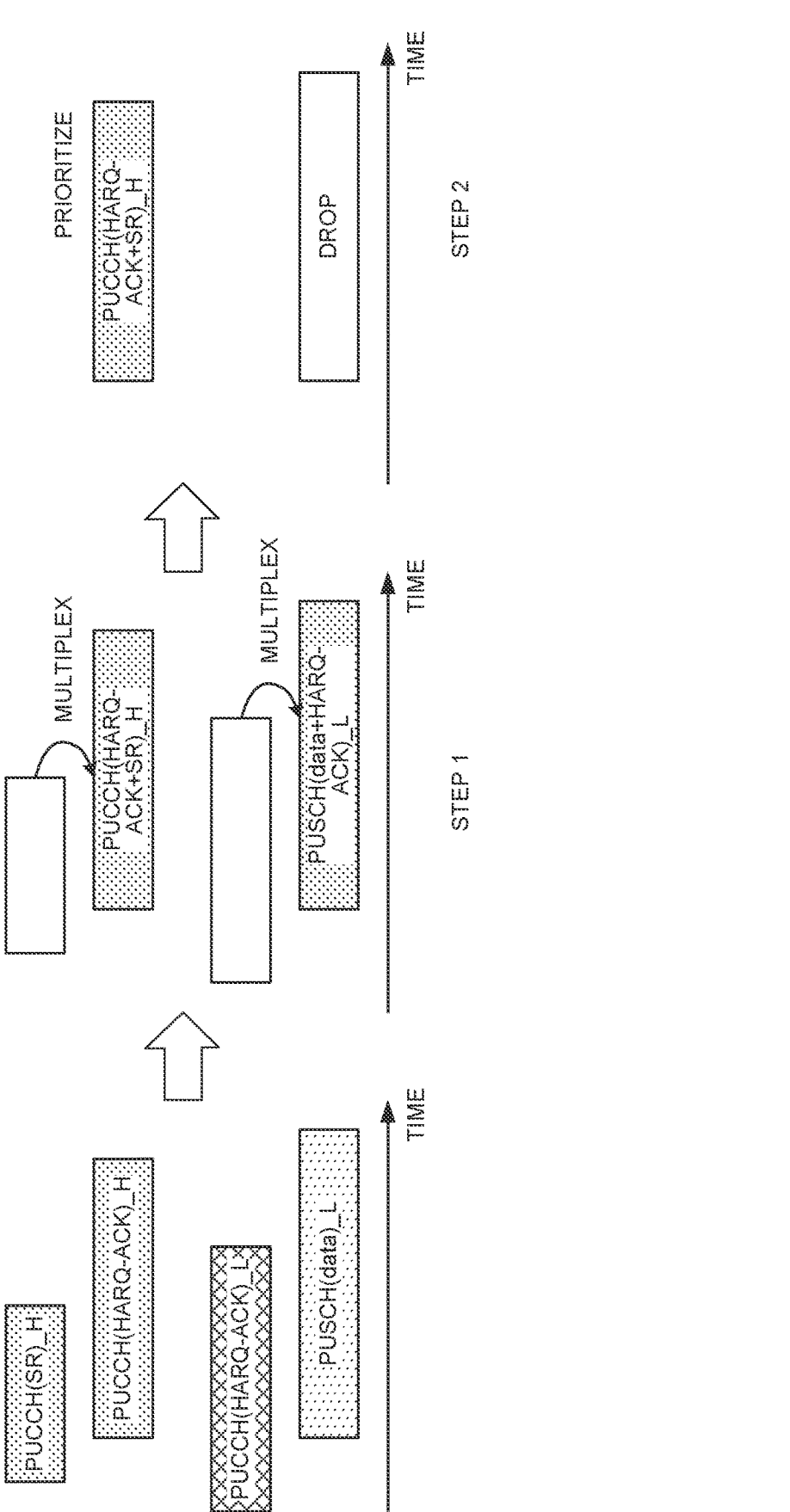
FIG. 2 is a diagram to show another example of UL transmission control based on priorities.

In future radio communication systems (for example, NR), traffic types (also referred to as services, service types, communication types, use cases, or the like), such as further enhancement of mobile broadband (for example, enhanced Mobile Broadband (eMBB)), machine type communication that implements multiple simultaneous connection (for example, massive Machine Type Communications (mMTC), Internet of Things (IoT)), and high-reliable and low-latency communication (for example, Ultra-Reliable and Low-Latency Communications (URLLC)), are assumed. For example, in URLLC, lower latency and higher reliability in comparison to eMBB are required.

The traffic type may be identified based on at least one of the followings in a physical layer.

Logical channel having different priority

Modulation and coding scheme (MCS) table (MCS index table)

Channel quality indication (CQI) table

DCI format (Radio network temporary indicator (RNTI (System Information-Radio Network Temporary Identifier)))

used for scrambling (masking) of cyclic redundancy check (CRC) bits included in (added to) the DCI (DCI format)

RRC (Radio Resource Control) parameter

Specific RNTI (for example, an RNTI for URLLC, an MCS-C-RNTI, or the like)

Search space

Certain field in DCI (for example, a newly added field or reuse of an existing field)

Specifically, the traffic type of an HARQ-ACK for a PDSCH may be determined based on at least one of the following.

An MCS index table used for determination of at least one of a modulation order, a target code rate, and a transport block size (TBS) of the PDSCH (for example, whether or not MCS index table 3 is used)

An RNTI used for CRC scrambling of DCI used for scheduling of the PDSCH (for example, which of a C-RNTI or an MCS-C-RNTI is used for the CRC scrambling)

The traffic type of an SR may be determined based on a higher layer parameter used as an identifier of the SR (SR-ID). The higher layer parameter may indicate whether the traffic type of the SR is eMBB or URLLC.

The traffic type of CSI may be determined based on configuration information related to a CSI report (CSIreportSetting), a DCI type used for a trigger, a DCI transmission parameter, or the like. The configuration information, the DCI type, or the like may indicate whether the traffic type of the CSI is eMBB or URLLC. The configuration information may be a higher layer parameter.

The traffic type of a PUSCH may be determined based on at least one of the following.

An MCS index table used for determination of at least one of a modulation order, a target code rate, and a TBS of the PUSCH (for example, whether or not MCS index table 3 is used)

An RNTI used for CRC scrambling of DCI used for scheduling of the PUSCH (for example, which of a C-RNTI or an MCS-C-RNTI is used for the CRC scrambling)

The traffic type may be associated with communication requirements (requirements or required conditions such as latency and an error rate), a data type (such as voice and data), and the like.

The difference between requirements of URLLC and requirements of eMBB may be that latency of URLLC is lower than latency of eMBB, or may be that the requirements of URLLC include requirements of reliability.

For example, requirements of user (U) plane latency of eMBB may include requirements that downlink U plane latency is 4 ms and uplink U plane latency is 4 ms. In contrast, requirements of U plane latency of URLLC may include requirements that downlink U plane latency is 0.5 ms and uplink U plane latency is 0.5 ms. Requirements of reliability of URLLC may include requirements that a 32-byte error rate is $10^5$ in U plane latency of 1 ms.

As enhanced Ultra Reliable and Low Latency Communications (eURLLC), mainly, enhancement of reliability of traffic for unicast data has been under study. URLLC and eURLLC are hereinafter simply referred to as URLLC when not being distinguished from each other.

<Configuration of Priority>

In NR of Rel. 16 or later versions, configuration of a plurality of levels (for example, two levels) of priorities for a certain signal or channel has been under study. For example, it is assumed that different priorities are configured for respective signals or channels corresponding to different traffic types (also referred to as services, service types, communication types, use cases, or the like) to perform communication control (for example, transmission control at the time of collision or the like). With this, communication can be controlled by configuring different priorities depending on the service type or the like for the same signal or channel.

The priority may be configured for at least one of a signal (for example, UCI such as HARQ-ACK, a reference signal, or the like), a channel (a PDSCH, a PUSCH, a PUCCH, or the like), a reference signal (for example, channel state information (CSI), a sounding reference signal (SRS), or the like), a scheduling request (SR), and an HARQ-ACK codebook. The priority may be configured for each of a PUCCH used for transmission of the SR, a PUCCH used for transmission of the HARQ-ACK, and a PUCCH used for transmission of the CSI.

The priority may be defined by a first priority (for example, high) and a second priority (for example, low) of a priority lower than the first priority. Alternatively, three or more levels of priorities may be configured.

For example, the priority may be configured for an HARQ-ACK for a dynamically scheduled PDSCH, an HARQ-ACK for a semi-persistent PDSCH (SPS PDSCH), and an HARQ-ACK for SPS PDSCH release. Alternatively, the priority may be configured for HARQ-ACK codebooks corresponding to these HARQ-ACKs. Note that, when the priority is configured for the PDSCH, the priority of the PDSCH may be interpreted as the priority of the HARQ-ACK for the PDSCH.

The priority may be configured for a dynamic grant-based PUSCH, a configured grant-based PUSCH, or the like.

Information related to the priority may be notified from the base station to the UE, using at least one of higher layer signaling and DCI. For example, the priority of the scheduling request may be configured with a higher layer parameter (for example, schedulingRequestPriority). The priority of the HARQ-ACK for the PDSCH (for example, a dynamic PDSCH) scheduled by DCI may be notified using the DCI. The priority of the HARQ-ACK for the SPS PDSCH may be configured with a higher parameter (for example, HARQ-ACK-Codebook-indicator-forSPS), or may be notified using DCI for indicating activation of the SPS PDSCH. A certain priority (for example, low) may be configured for P-CSI/SP-CSI transmitted on the PUCCH. In contrast, a priority for A-CSI/SP-CSI transmitted on the PUSCH may be notified using DCI (for example, DCI for a trigger or DCI for activation).

The priority of the dynamic grant-based PUSCH may be notified using DCI for scheduling the PUSCH. The priority of the configured grant-based PUSCH may be configured with a higher layer parameter (for example, priority). A certain priority (for example, low) may be configured for a P-SRS/SP-SRS and an A-SRS triggered by DCI (for example, DCI format 0_1/DCI format 2_3).

(Overlapping of UL Transmissions)

When a plurality of UL signals/UL channels overlap (or collide), the UE may control UL transmissions, based on the priority.

The case in which a plurality of UL signals/UL channels overlap may be a case in which time resources (or time resources and frequency resources) of a plurality of UL signals/UL channels overlap, or a case in which transmission timings of a plurality of UL signals/UL channels overlap.

The time resources may be interpreted as a time domain. The time resources may be a unit of a symbol, a slot, a sub-slot, or a subframe.

Overlapping of a plurality of UL signals/UL channels in the same UE (for example, intra-UE) may mean that a plurality of UL signals/UL channels overlap at least in the same time resources (for example, symbol). Collision of A fact that UL signals/UL channels in different UEs (for example, inter-UE) may mean that a plurality of UL signals/UL channels overlap in the same time resources (for example, symbol) and frequency resources (for example, RB).

For example, when a plurality of UL signals/UL channels having the same priority overlap, the UE performs control to multiplex the plurality of UL signals/UL channels on one UL channel and transmit the UL channel (see FIG. 1A).

FIG. 1A shows a case in which an HARQ-ACK configured with the first priority (high) (or a PUCCH for HARQ-ACK transmission) and UL data/UL-SCH configured with the first priority (high) (or a PUSCH for UL data/UL-SCH transmission) overlap. In this case, the UE multiplexes (or maps) the HARQ-ACK on the PUSCH and transmits both of the UL data and the HARQ-ACK.

When a plurality of UL signals/UL channels with different priorities overlap, the UE may perform control to perform UL transmission having a high priority (for example, prioritize UL transmission having a high priority) and to not perform (for example, to drop) UL transmission having a low priority (see FIG. 1B).

FIG. 1B shows a case in which UL data/HARQ-ACK configured with the first priority (high) (or a UL channel for UL data/HARQ-ACK transmission) and UL data/HARQ-ACK configured with the second priority (low) (or a UL channel for UL data/HARQ-ACK transmission) overlap. In this case, the UE performs control to drop the UL data/HARQ-ACK having a low priority and prioritize transmission of the UL data/HARQ-ACK having a high priority. Note that the UE may change (for example, defer or shift) transmission timing of UL transmission having a low priority.

When more than two (or three or more) UL signals/UL channels overlap in the time domain, transmission may be controlled in two steps (see FIG. 2).

In step 1, one UL channel for multiplexing UL signals to be transmitted in respective UL transmissions having the same priority is selected. In FIG. 2, an SR (or a PUCCH for SR transmission) having the first priority (high) and an HARQ-ACK (or a PUCCH for HARQ-ACK transmission) may be multiplexed on a certain UL channel (here, the PUCCH for HARQ-ACK transmission). Similarly, an HARQ-ACK (or a PUCCH for HARQ-ACK transmission) having the second priority (low) and data (or a PUSCH for data/UL-SCH transmission) may be multiplexed on a certain UL channel (here, the PUSCH).

In step 2, control may be performed, for UL transmissions with different priorities, to prioritize transmission of UL transmission having a high priority and to drop UL transmission having a low priority. In FIG. 2, transmission of the PUCCHs for SR and HARQ-ACK transmission having the first priority (high) may be prioritized and the PUSCHs for HARQ-ACK and data transmission having the second priority (low) may be dropped.

In this manner, the UE can solve a collision between a plurality of UL transmissions having the same priority in step 1 and solve a collision between a plurality of UL transmissions having different priorities in step 2.

Incidentally, the following case is also considered in which a plurality of UL transmissions respectively transmitted in different carriers (or cells, CCs) overlap in the time domain and the plurality of UL transmissions have different priorities. In such a case, how to control the plurality of UL transmissions has not yet been fully studied.

For example, when UL channels/UL signals are scheduled in different carriers of inter-cells supported by different RFs (Radio Frequencies), transmitting the respective UL channels/UL signals is useful from the perspective of achievement of low latency and spectral efficiency. For example, when the UE supports RF processing for each of different carriers (CCs), transmitting UL channels/UL signals in respective carriers allows for enhancement of resource use efficiency and achievement of low latency.

The inventors of the present invention focused on a case in which a plurality of UL transmissions with different priorities are configured/scheduled in the same time domain respectively in different carriers (or cells, CCs), and thus studied control of the plurality of UL transmissions and came up with the idea of an aspect of the present embodiment.

Embodiments according to the present disclosure will be described in detail with reference to the drawings as follows. The configurations to be described in respective aspects may each be employed individually, or may be employed in combination.

In the present disclosure, "A/B" may be interpreted as at least one of A and B, and "A/B/C" may be interpreted as at least one of A, B, and C.

The following description will be given by taking two levels, i.e., the first priority (high) and the second priority (low), as examples of priorities of UL transmissions. However, the priorities are not limited to the two levels. Three or more levels of priorities may be configured.

In the present disclosure, UL transmission, a UL channel, and a UL signal may be interchangeably interpreted as each other. In the present disclosure, a carrier, a cell, a CC, a BWP, and a band may be interchangeably interpreted as each other. In the present disclosure, "to be transmitted" may be interpreted as "to be scheduled", "to be configured", or "to be assigned".

(First Aspect)

A first aspect will describe an example of UL transmission control of a case in which a plurality of UL transmissions with different priorities overlap (or collide) in the time domain.

When a plurality of UL transmissions with different priorities are scheduled, configured, or allocated in the same time domain, the UE may control the plurality of UL transmissions, based on information notified from a network (for example, the base station). The following description will be given by taking a collision between the PUSCH and the PUCCH as an example. However, this is not restrictive, and application to a collision between other UL channels/UL signals is also possible.

The base station may notify the UE of/configure the UE with information related to simultaneous transmission of UL transmissions (or UL channels/UL signals). The UE may control transmission processing (for example, simultaneous transmission, dropping, or the like) for the plurality of UL transmissions overlapping in the time domain, based on the information related to the simultaneous transmission notified/configured from the base station.

The information related to the simultaneous transmission may be notified/configured from the base station to the UE, using at least one of higher layer signaling (for example, RRC signaling, MAC signaling, or the like) and DCI. The following will describe cases (option 1-1 and option 1-2) in which the information related to the simultaneous transmission is notified/configured to the UE, using higher layer signaling (or higher layer parameter (s)).

<Option 1-1>

As the information related to the simultaneous transmission, a plurality of higher layer parameters may be applied. In this case, the UE may control the simultaneous transmission of the plurality of UL transmissions, based on a plurality of higher layer parameters.

The information related to the simultaneous transmission may include at least one of information indicating whether the simultaneous transmission of the UL transmissions is configured, information indicating the number of cells supporting the simultaneous transmission of the UL transmissions, and information (for example, cell index(es)/CC index(es)) indicating the cell(s) supporting the simultaneous transmission of the UL transmissions.

The information indicating whether the simultaneous transmission of the UL transmissions is configured may be notified using a first higher layer parameter (for example, simultaneousULTX). The information indicating the number of cells supporting the simultaneous transmission of the UL transmissions may be notified using a second higher layer parameter (for example, nrofCCsimultaneousULTX). The information indicating cell indices supporting the simultaneous transmission of the UL transmissions may be notified using a third higher layer parameter (for example, ccIndex).

The UE may determine at least one of the cells (for example, the cell indices/CC indices) to which the UL simultaneous transmission is to be applied and the number of cells, based on a plurality of higher layer parameters (for example, notification contents of each of the higher layer parameters).

When the first higher layer parameter (for example, simultaneousULTX={enable, disable}/{true, false}) is configured to a positive one ("enable" or "true"), the UE may perform control to apply the simultaneous transmission of the plurality of UL transmissions. In contrast, when the first higher layer parameter (for example, simultaneousULTX={enable, disable}/{true, false}) is configured to a positive one ("disable" or "false"), the UE may control not to apply the simultaneous transmission of the plurality of UL transmissions (for example, to drop the UL transmission having a low priority).

When the first higher layer parameter is configured to the positive one, the UE may determine the number of cells supporting the simultaneous transmission, based on the second higher layer parameter (for example, nrofCCsimultaneousULTX={2, . . . , X}).

When the first higher layer parameter is configured to the positive one, the UE may determine the cell indices supporting the simultaneous transmission, based on the third higher layer parameter (for example, ccIndex: BIT STRING (SIZE (Y))). The third higher layer parameter may give notification of combinations of cells (or CCs) in which the simultaneous transmission can be performed, or may give notification of the cells in which the simultaneous transmission is permitted.

Y (for example, the size) may correspond to the number of cells (for example, nrofCCsimultaneousULTX) in which the simultaneous transmission can be performed. The bit string (BIT STRING) may give notification of cells in which the UE can simultaneously perform the UL transmissions (for example, the PUSCH/PUCCH). For example, when Y=2 and the bit string is {1, 1}, the UE may support the UL simultaneous transmission in CC #1 and CC #2.

The UE may determine the cells supporting the simultaneous transmission, based on both of the second higher layer parameter and the third higher layer parameter. Alternatively, the UE may determine the cells supporting the simultaneous transmission, based on one of the second higher layer parameter and the third higher layer parameter.

When the UE determines the cells supporting the simultaneous transmission by using the second higher layer parameter (without using the third higher layer parameter), the UE may determine that the simultaneous transmission can be performed in all of the configured cells.

When the UE determines the cells supporting the simultaneous transmission by using the third higher layer parameter (without using the second higher layer parameter), the UE may determine that the simultaneous transmission can be performed regarding a total number (or Y) of combinations of cells configured using the third higher layer parameter.

For example, when the first higher layer parameter is configured to the positive one, the second higher layer parameter indicates 2 (for example, nrofCCsimultaneousULTX=2), and the third higher layer parameter indicates CC #1 and CC #2 (ccIndex=(1, 1)), the UE may apply the simultaneous transmission of the UL transmissions in CC #1 and CC #2.

In this manner, by notifying the UE of/configuring the UE with the information related to the UL simultaneous transmission from the base station, even when a plurality of UL transmissions with different priorities overlap in the time domain, the simultaneous transmission can be supported regarding specific combinations of the UL transmissions. With this, low latency can be achieved, and communication quality can be prevented from deteriorating.

<Option 1-2>

As the information related to the simultaneous transmission, a certain (for example, one) higher layer parameter may be applied. In this case, the UE may control the simultaneous transmission of the plurality of UL transmissions, based on one higher layer parameter.

The certain higher layer parameter (for example, ccIndexSimultaneousULTX) may at least include information (for example, cell index(es)/CC index(es)) related to cell(s) in which the simultaneous transmission is permitted. When the certain higher layer parameter is configured, the UE may perform control to apply the UL simultaneous transmission. In such a case, the UE may determine the cells (or combinations of cells) in which the simultaneous transmission is permitted, based on the certain higher layer parameter.

When the certain higher layer parameter is configured (or is enabled), the UE may determine the cell indices supporting the simultaneous transmission, based on the certain higher layer parameter (for example, ccIndexSimultaneousULTX: BIT STRING (SIZE (Y))). The certain higher layer parameter may give notification of combinations of cells (or CCs) in which the simultaneous transmission can be performed, or may give notification of the cells in which the simultaneous transmission is permitted.

Y (for example, the size) may correspond to the number of cells in which the simultaneous transmission can be performed. The bit string (BIT STRING) may give notification of cells in which the UE can simultaneously perform the UL transmissions (for example, the PUSCH/PUCCH). For example, when Y=2 and the bit string is {1, 1}, the UE may support the UL simultaneous transmission in CC #1 and CC #2.

In this manner, by giving notification of/configuring the UL simultaneous transmission based on one higher layer parameter, overhead can be prevented from increasing.

<UE Operation>

The UE may control transmission processing (for example, simultaneous transmission, dropping, or the like) for a plurality of UL transmissions overlapping in the time domain, based on higher layer signaling or the like notified/configured from the base station.

[Case 1]

What is assumed here is a case in which simultaneous transmission of UL transmissions is not configured (for example, a case in which the first higher layer parameter in option 1-1 is "disable" or "false", or a case in which the certain higher layer parameter in option 1-2 is not configured).

In such a case, when a plurality of UL transmissions with different priorities overlap in the time domain, the UE may perform control to transmit only a first UL transmission having the first priority (for example, high) and drop a second UL transmission having the second priority (for example, low). For example, not only when the plurality of UL transmissions are transmitted in the same cell but also when the plurality of UL transmissions are transmitted in different cells (for example, CC #1 and CC #2), the UE may transmit the first UL transmission and drop the second UL transmission (see FIG. 3).

Figure 3:
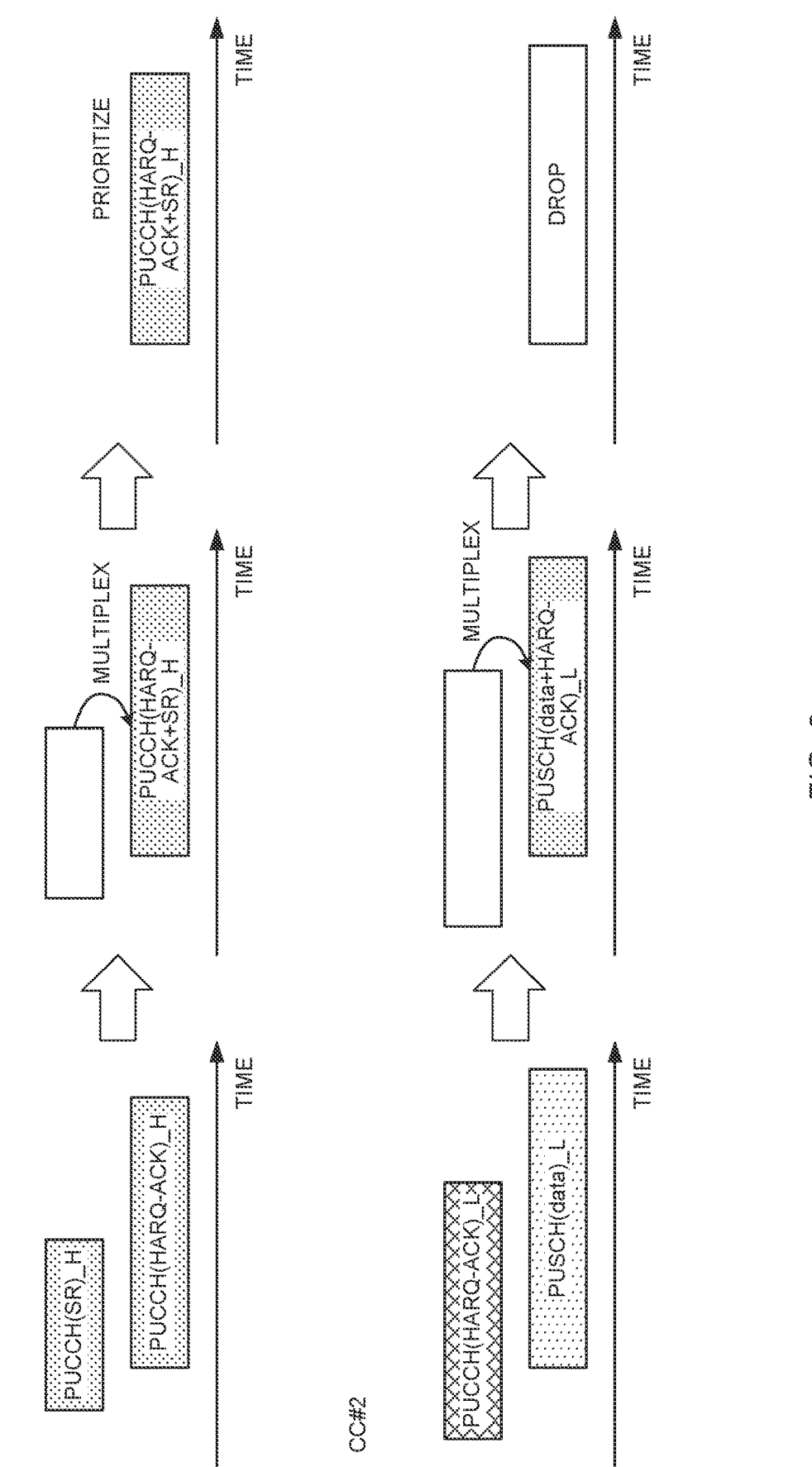
FIG. 3 is a diagram to show an example of UL transmission control according to the present aspect.

FIG. 3 shows a case in which four UL transmissions overlap in the same time domain in a plurality of cells (CC #1 and CC #2). Specifically, a case is shown in which two UL transmissions having the same priority (here, high) overlap in CC #1 and two UL transmissions having the same priority (here, low) overlap in CC #2. In this case, the UE may control transmission in two steps.

In step 1, one UL channel for multiplexing UL signals to be transmitted in respective UL transmissions having the same priority is selected. In FIG. 3, in CC #1, an SR (or a PUCCH for SR transmission) having the first priority (high) and an HARQ-ACK (or a PUCCH for HARQ-ACK transmission) may be multiplexed on a certain UL channel (here, the PUCCH for HARQ-ACK transmission). Similarly, in CC #2, an HARQ-ACK (or a PUCCH for HARQ-ACK transmission) having the second priority (low) and data (or a PUSCH for data/UL-SCH transmission) may be multiplexed on a certain UL channel (here, the PUSCH).

Note that, when there are not such a plurality of UL transmissions having the same priority and colliding in the time domain, the operation of step 1 may be omitted. Step 1 may be limited to a plurality of UL transmissions transmitted in the same cell, or may be applied to a plurality of UL transmissions respectively transmitted in a plurality of cells.

In step 2, control may be performed, for UL transmissions with different priorities, to prioritize transmission of UL transmission having a high priority and to drop UL transmission having a low priority. In FIG. 3, transmission of the PUCCH (CC #1) for SR+HARQ-ACK transmission having the first priority (high) may be prioritized and the PUSCH (CC #2) for HARQ-ACK+data transmission having the second priority (low) may be dropped.

With this, transmission of the UL transmission having a high priority, i.e., the first priority (high), can be prioritized, and transmission processing of the UE can be simplified.

[Case 2]

What is assumed here is a case in which simultaneous transmission of UL transmissions is configured (for example, a case in which the first higher layer parameter in example, a case in which the first higher layer parameter in option 1-1 is "enable" or "true", or a case in which the certain higher layer parameter in option 1-2 is configured).

For example, the following case is assumed: UL simultaneous transmission in CC #1 and CC #2 is supported, and the first UL transmission having the first priority (for example, high) transmitted in CC #1 and the second UL transmission having the second priority (for example, low) transmitted in CC #2 collide. In such a case, the UE may perform control to transmit both of the first UL transmission having the first priority (for example, high) and the second UL transmission having the second priority (for example, low) (see FIG. 4).

Figure 4:
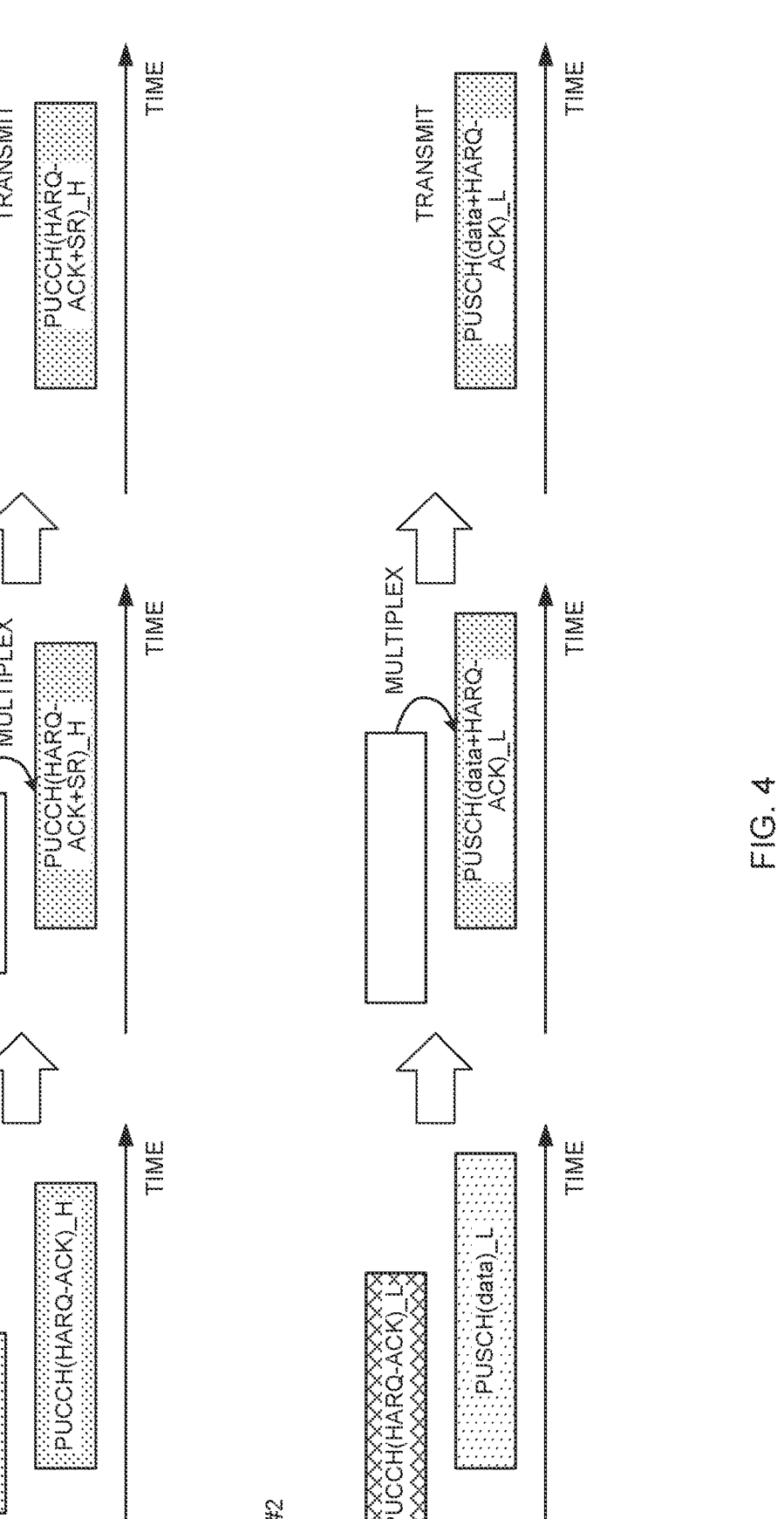
FIG. 4 is a diagram to show an example of other UL transmission control according to the present aspect.

FIG. 4 shows a case in which four UL transmissions overlap in the same time domain in a plurality of cells (CC #1 and CC #2). Specifically, a case is shown in which two UL transmissions having the same priority (here, high) overlap in CC #1 and two UL transmissions having the same priority (here, low) overlap in CC #2. In this case, the UE may control transmission in two steps.

In step 1, one UL channel for multiplexing UL signals to be transmitted in respective UL transmissions having the same priority is selected. FIG. 4 shows a case in which, in CC #1, an SR having the first priority (high) is multiplexed on a PUCCH for HARQ-ACK transmission. Similarly, a case is shown in which, in CC #2, an HARQ-ACK having the second priority (low) is multiplexed on a PUSCH for data/UL-SCH transmission.

Note that, when a plurality of UL transmissions having the same priority do not collide in the time domain, the operation of step 1 may be omitted. Step 1 may be limited to a plurality of UL transmissions transmitted in the same cell, or may be applied to a plurality of UL transmissions respectively transmitted in a plurality of cells. For example, step 1 may also be applied to a case in which UL transmissions having the first priority are transmitted in respective CC #1 and CC #2, and UL transmissions having the second priority are transmitted in respective CC #1 and CC #2.

In step 2, simultaneous transmission overlaps in the time domain in a plurality of cells in which the simultaneous transmission is permitted, and respective UL transmissions with different priorities are transmitted. In FIG. 4, the UE transmits the PUCCH (CC #1) for SR+HARQ-ACK transmission having the first priority (high) and transmits the PUSCH (CC #2) for HARQ-ACK+data transmission having the second priority (low).

With this, not only the UL transmission having a high priority but also the UL transmission having a low priority can be transmitted, and therefore a low latency can be achieved.

(Second Aspect)

A second aspect will describe UE capability information of a case in which a plurality of UL transmissions with different priorities overlap (or collide) in the time domain.

In a radio communication system in which simultaneous transmission of a plurality of UL transmissions with different priorities (for example, a plurality of UL transmissions overlapping (or colliding) in the time domain) is supported, the UE may report UE capability information related to support of the simultaneous transmission. For example, as the UE capability information, the UE may perform control to report at least one of the following option 2-1 and option 2-2.

<Option 2-1>

As the UE capability information related to the simultaneous transmission, the UE may report capability information indicating whether or not the UL simultaneous transmission is supported. The capability information may be reported for each UE, for each band, for each band combination, or for each cell.

For example, when the UE capability information related to the simultaneous transmission is reported for each band, the UE may perform control to support (or apply/activate) the simultaneous transmission in the reported band. The band may be interpreted as a frequency range (for example, FR_X (for example, X=1, 2, 3, or 4)).

<Option 2-2>

As the UE capability information related to the simultaneous transmission, the UE may report capability information indicating cell(s) (or CC(s)) supporting the UL simultaneous transmission. The capability information may be reported for each UE, for each band, for each band combination, or for each cell.

The capability information indicating the cell supporting the UL simultaneous transmission may be the number of cells with which the UE supports the UL simultaneous transmission. For example, the UE may report a certain candidate value/a value selected out of a candidate range (for example, {2, . . . , X}).

Alternatively, the capability information indicating the cells supporting the UL simultaneous transmission may be the cell index(es) (or CC index(es)) with which the UE supports the UL simultaneous transmission.

The capability information related to the simultaneous transmission reported by the UE and the information related to the simultaneous transmission notified from the base station may be combined. For example, the base station may control notification/configuration of the higher layer parameter, based on the capability information reported from the UE.

For example, when the UE reports X as the number of cells supporting the UL simultaneous transmission, the base station may notify the UE of/configure the UE with X as the information (for example, the second higher layer parameter (nrofCCsimultaneousULTX)) indicating the number of cells supporting the simultaneous transmission of UL transmissions. Alternatively, the base station may determine the size of the third higher layer parameter or the certain higher layer parameter, based on the value (for example, X) reported from the UE.

In this manner, by reporting the UE capability information related to the simultaneous transmission to the base station, the UL simultaneous transmission can be flexibly controlled for each UE.

<UL Transmission>

The UL transmission described above may be selected from at least one of a dynamic grant-based PUSCH, a configured grant-based PUSCH, a PUCCH, a random access channel (PRACH), a PUSCH scheduled using a random access response (RAR), and a PUSCH to which repetitive transmission is applied. The plurality of UL transmissions colliding in the time domain may be UL transmissions selected from the dynamic grant-based PUSCH, the configured grant-based PUSCH, the PUCCH, the PRACH, the PUSCH scheduled using the RAR, and the PUSCH to which repetitive transmission is applied.

<Variations>

Whether the UL simultaneous transmission is configured (or supported) may be configured not only in a unit of a cell (or a CC) but may be configured in another unit as well. For example, the UL simultaneous transmission may be configured for each cell group/band.

A type (or a category) of the UL channels/UL signals for which the UL simultaneous transmission is supported may be configured. Alternatively, the simultaneous transmission may not be configured (or not be supported) for specific UL channels/UL signals.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 5:
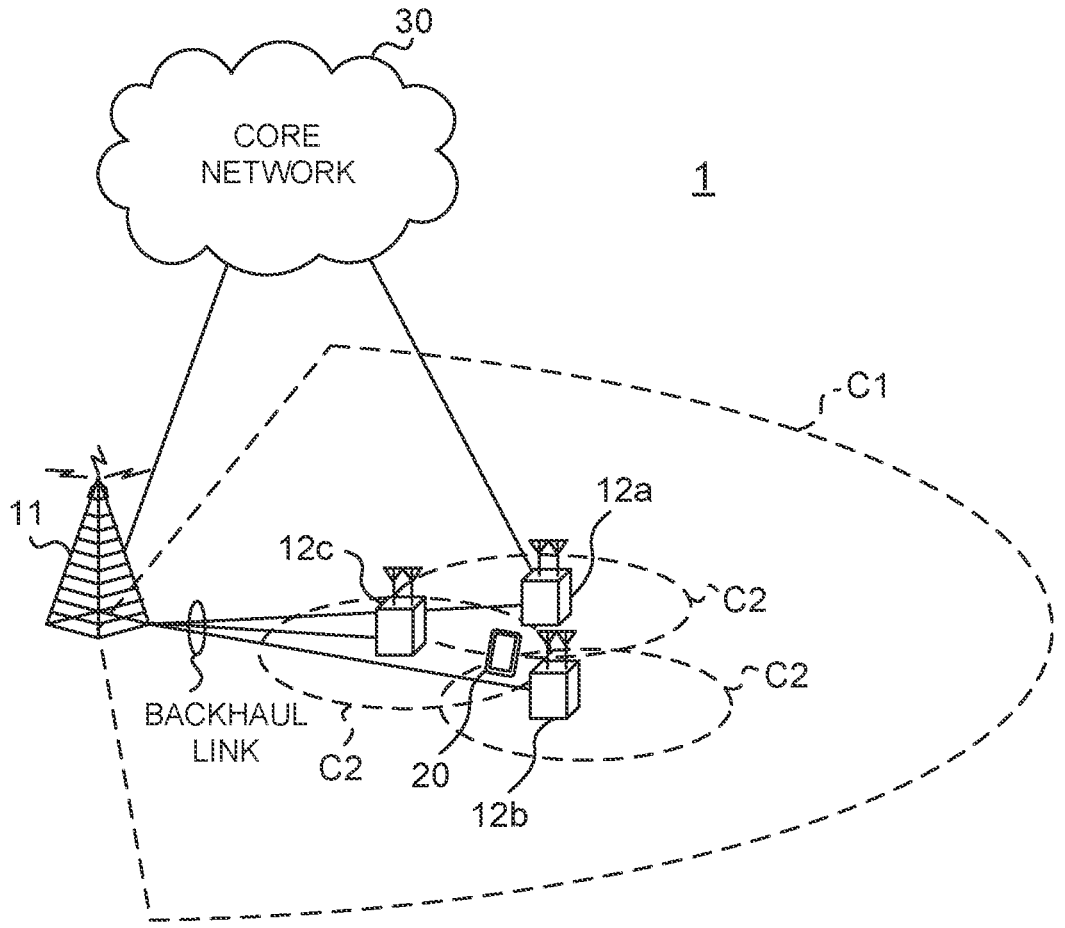
FIG. 5 is a diagram to show an example of a schematic structure of a radio communication system according to one embodiment.

FIG. 5 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 6:
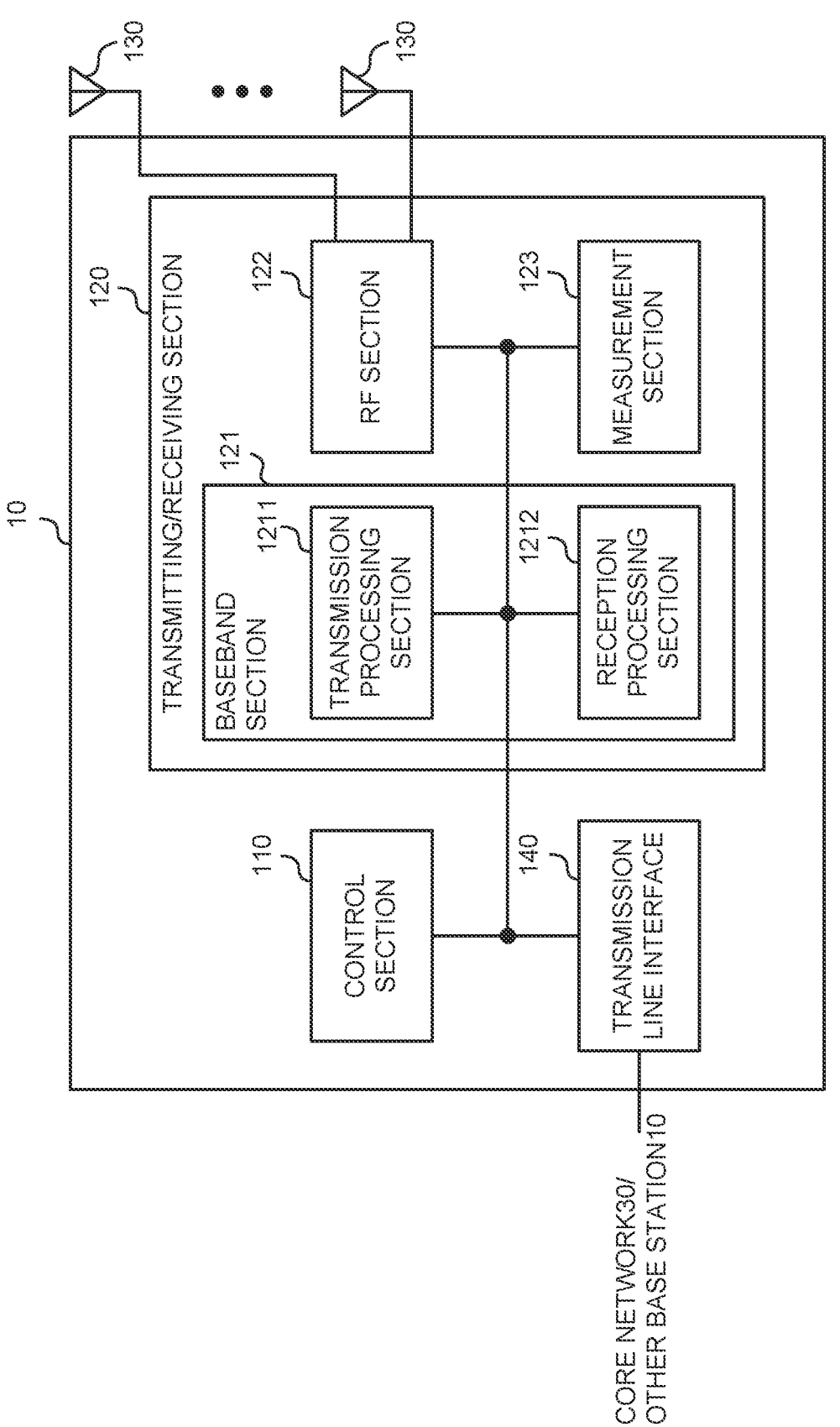
FIG. 6 is a diagram to show an example of a structure of a base station according to one embodiment.

FIG. 6 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

The transmitting/receiving section 120 may transmit information related to simultaneous transmission of UL transmissions.

The control section 110 may, when a plurality of UL transmissions with different priorities overlap in a time domain, control reception of the plurality of UL transmissions in which transmissions are controlled based on the information related to the simultaneous transmission.

(User Terminal)

Figure 7:
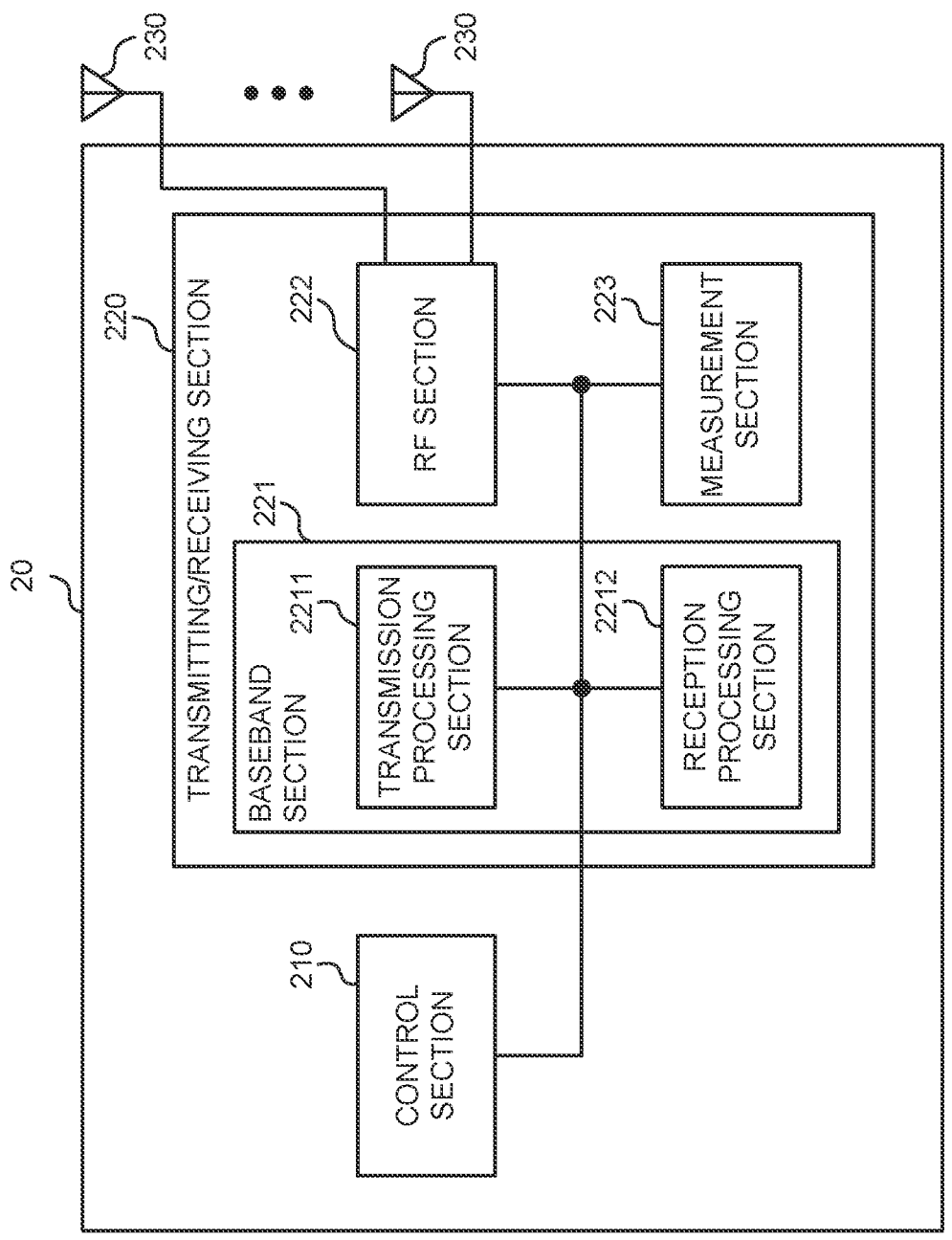
FIG. 7 is a diagram to show an example of a structure of a user terminal according to one embodiment.

FIG. 7 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/ receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/ receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/ receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive information related to simultaneous transmission of UL transmissions.

The transmitting/receiving section 220 may transmit at least one of first capability information indicating whether the simultaneous transmission of the UL transmissions is supported, second capability information indicating number of cells supporting the simultaneous transmission of the UL transmissions, and third capability information indicating a cell index supporting the simultaneous transmission of the UL transmissions. The transmitting/receiving section 220 may transmit at least one of the first capability information, the second capability information, and the third capability information for each band, for each band combination, or for each cell.

The control section 210 may, when a plurality of UL transmissions with different priorities overlap in a time domain, control transmission processing of the plurality of UL transmissions, based on the information related to the simultaneous transmission.

The information related to the simultaneous transmission may include at least one of information indicating whether the simultaneous transmission of the UL transmissions is configured, information indicating number of cells supporting the simultaneous transmission of the UL transmissions, and information indicating a cell index supporting the simultaneous transmission of the UL transmissions.

The control section 210 may perform control to report at least one of the first capability information, the second capability information, and the third capability information for each band, for each band combination, or for each cell. For example, the control section 210 may perform control to report capability information (at least one of the first capability information, the second capability information, and the third capability information) corresponding to a specific band, a specific band combination, or a specific cell.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 8:
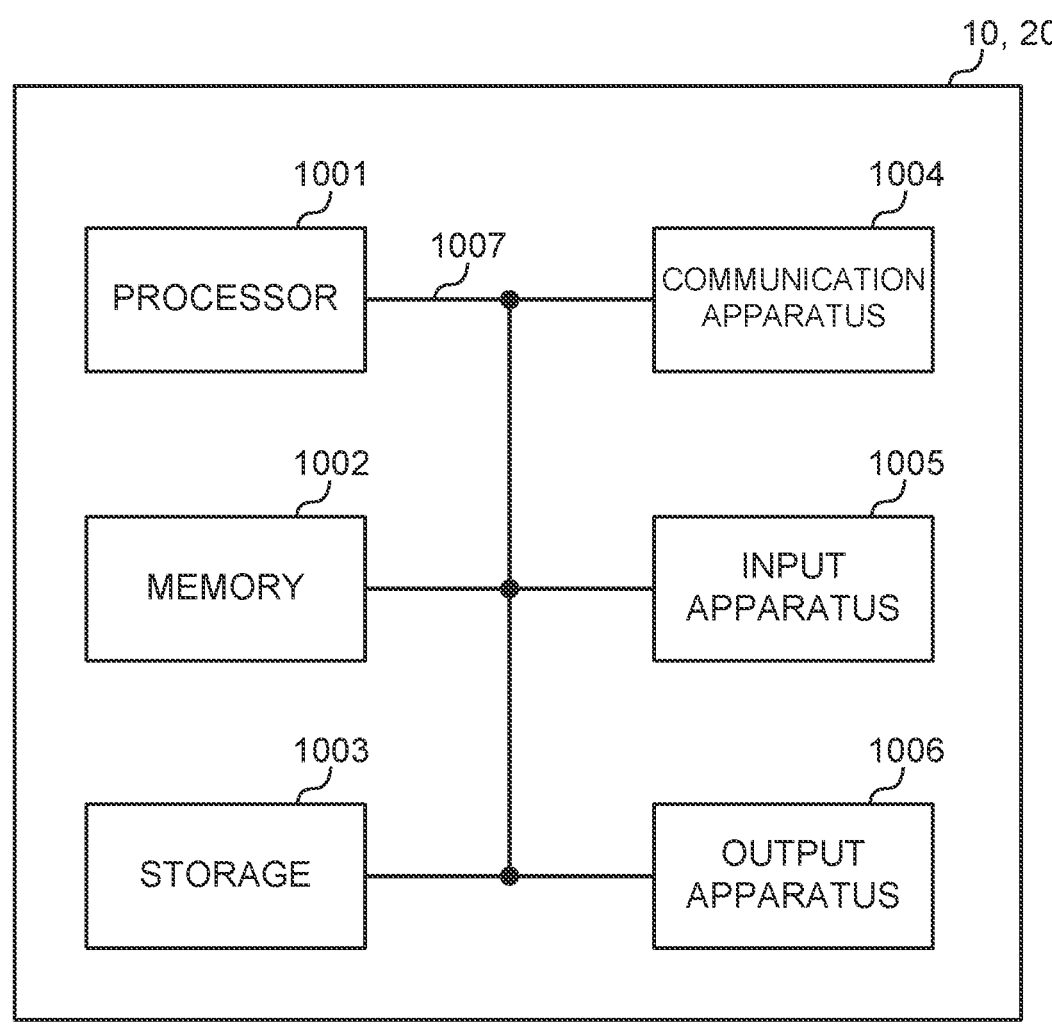
FIG. 8 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 8 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 MS.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/ channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal,"

"wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The present application is based on Japanese Patent Application No. 2020-140224 filed on Aug. 21, 2020, the entire contents of which are incorporated herein by reference.

What is claimed is:

1. A terminal comprising:

a transmitter that transmits capability information of the terminal regarding support of simultaneous transmission of a plurality of uplink (UL) transmissions comprising a Physical Uplink Control Channel (PUCCH) transmission and a Physical Uplink Shared Channel (PUSCH) transmission with different priorities;

a receiver that receives information regarding simultaneous transmission of the plurality of UL transmissions comprising the PUCCH transmission and the PUSCH transmission with different priorities; and a processor that, when the plurality of UL transmissions comprising the PUCCH transmission and the PUSCH transmission with different priorities overlap in a time domain, controls to simultaneously transmit the plurality of UL transmissions comprising the PUCCH transmission and the PUSCH transmission with different priorities, based on the information regarding simultaneous transmission, wherein the information regarding the simultaneous transmission includes a plurality of higher layer parameters, the processor controls to apply simultaneous transmission of the plurality of UL transmissions comprising the PUCCH transmission and the PUSCH transmission with different priorities in response to a first higher layer parameter of the plurality of higher layer parameters being configured enabled and not to apply simultaneous transmission of the plurality of UL transmissions comprising the PUCCH transmission with different priorities in response to the first higher layer parameter not being configured enabled, and a priority of a dynamic grant-based PUSCH is notified to the terminal using Downlink Control Information (DCI), and a priority of a configured grant-based PUSCH is configured for the terminal using a higher layer parameter.

2. The terminal according to claim 1, wherein the capability information is reported per band combination.

3. A radio communication method for a terminal, comprising:

transmitting capability information of the terminal regarding support of simultaneous transmission of a plurality of uplink (UL) transmissions comprising a Physical Uplink Control Channel (PUCCH) transmission and a Physical Uplink Shared Channel (PUSCH) transmission with different priorities;

receiving information regarding simultaneous transmission of the plurality of UL transmissions comprising the PUCCH transmission and the PUSCH transmission with different priorities, wherein the information regarding the simultaneous transmission includes a plurality of higher layer parameters;

controlling to apply simultaneous transmission of the plurality of UL transmissions comprising the PUCCH transmission and the PUSCH transmission with different priorities in response to a first higher layer parameter of the plurality of higher layer parameters being configured enabled and not to apply simultaneous transmission of the plurality of UL transmissions comprising the PUCCH transmission and the PUSCH transmission with different priorities in response to the first higher layer parameter not being configured enabled; and when the plurality of UL transmissions comprising the PUCCH transmission and the PUSCH transmission with different priorities overlap in a time domain, controlling to simultaneously transmit the plurality of UL transmissions comprising the PUCCH transmission and the PUSCH transmission with different priorities, based on the information regarding simultaneous transmission, wherein a priority of a dynamic grant-based PUSCH is notified to the terminal using Downlink Control Information (DCI), and a priority of a configured grant-based PUSCH is configured for the terminal using a higher layer parameter.

4. A base station comprising:

a receiver that receives capability information of a terminal regarding support of simultaneous transmission of a plurality of uplink (UL) transmissions comprising a Physical Uplink Control Channel (PUCCH) transmission and a Physical Uplink Shared Channel (PUSCH) transmission with different priorities;

a transmitter that transmits information regarding simultaneous transmission of the plurality of UL transmissions comprising the PUCCH transmission and the PUSCH transmission with different priorities; and a processor that, when the plurality of UL transmissions comprising the PUCCH transmission and the PUSCH transmission with different priorities overlap in a time domain, controls reception processing in response to the plurality of UL transmissions comprising the PUCCH transmission and the PUSCH transmission with different priorities that are simultaneously transmitted based on the information regarding simultaneous transmission, wherein the information regarding the simultaneous transmission includes a plurality of higher layer parameters, the processor controls to configure a first higher layer parameter, of the plurality of higher layer parameters, to be enabled for applying simultaneous transmission of the plurality of UL transmissions comprising the PUCCH transmission and the PUSCH transmission with different priorities and to configure the first higher layer parameter not to be enabled for not applying simultaneous transmission of the plurality of UL transmissions comprising the PUCCH transmission and the PUSCH transmission with different priorities, and the base station notifies the terminal of a priority of a dynamic grant-based PUSCH using Downlink Control Information (DCI), and configures the terminal with a priority of a configured grant-based PUSCH using a higher layer parameter.

5. A system comprising a terminal and a base station, wherein the terminal comprises:

a transmitter of the terminal that transmits capability information of the terminal regarding support of simultaneous transmission of a plurality of uplink (UL) transmissions comprising a Physical Uplink Control Channel (PUCCH) transmission and a Physical Uplink Shared Channel (PUSCH) transmission with different priorities;

a receiver of the terminal that receives information regarding simultaneous transmission of the plurality of UL transmissions comprising the PUCCH transmission and the PUSCH transmission with different priorities; and a processor of the terminal that, when the plurality of UL transmissions comprising the PUCCH transmission and the PUSCH transmission with different priorities overlap in a time domain, controls to simultaneously transmit the plurality of UL transmissions comprising the PUCCH transmission and the PUSCH transmission with different priorities, based on the information regarding simultaneous transmission, wherein the information regarding the simultaneous transmission includes a plurality of higher layer parameters, the processor of the terminal controls to apply simultaneous transmission of the plurality of UL transmissions comprising the PUCCH transmission and the PUSCH transmission with different priorities in response to a first higher layer parameter of the plurality of higher layer parameters being configured enabled and not to apply simultaneous transmission of the plurality of UL transmissions comprising the PUCCH transmission and the PUSCH transmission with different priorities in response to the first higher layer parameter not being configured enabled, and a priority of a dynamic grant-based PUSCH is notified to the terminal using Downlink Control Information (DCI), and a priority of a configured grant-based PUSCH is configured for the terminal using a higher layer parameter, and the base station comprises:

a receiver of the base station that receives the capability information;

a transmitter of the base station that transmits the information regarding simultaneous transmission; and a processor of the base station that, when the plurality of UL transmissions comprising the PUCCH transmission and the PUSCH transmission with different priorities overlap in the time domain, controls reception processing in response to the plurality of UL transmissions comprising the PUCCH transmission and the PUSCH transmission with different priorities that are simultaneously transmitted based on the information regarding simultaneous transmission, wherein the processor of the base station controls to configure the first higher layer parameter to be enabled for applying simultaneous transmission of the plurality of UL transmissions comprising the PUCCH transmission and the PUSCH transmission with different priorities and to configure the first higher layer parameter not to be enabled for not applying simultaneous transmission of the plurality of UL transmissions comprising the PUCCH transmission and the PUSCH transmission with different priorities.

\* \* \* \* \*